No. 835,073. PATENTED NOV. 6, 1906.
C. J. LE VALLEY & W. T. BIRD.
CAPSTAN AND HORSE POWER.
APPLICATION FILED NOV. 4, 1905.
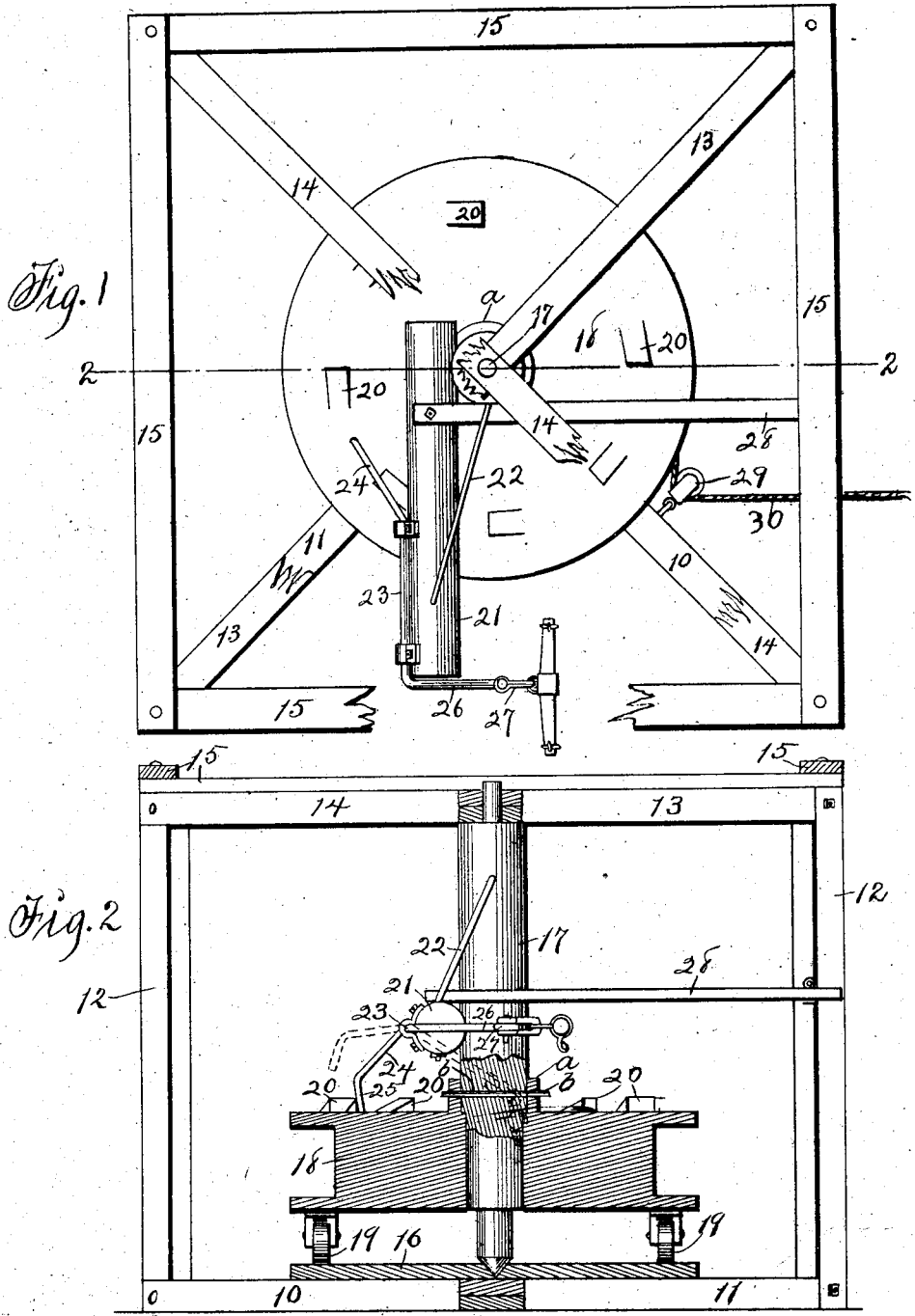

UNITED STATES PATENT OFFICE.

CHARLES J. LE VALLEY AND WILLIAM T. BIRD, OF SHEFFIELD, IOWA.

CAPSTAN AND HORSE-POWER.

No. 835,073. Specification of Letters Patent. Patented Nov. 6, 1906.

Application filed November 4, 1905. Serial No. 286,151.

*To all whom it may concern:*

Be it known that we, CHARLES J. LE VALLEY and WILLIAM T. BIRD, citizens of the United States, residing at Sheffield, in the county of Franklin and State of Iowa, have invented a new and useful Capstan and Horse-Power Adjustably Combined, of which the following is a specification.

Our object is, first, to provide means for connecting and disconnecting the drum of a capstan from the driving mechanism thereof, which is practically a horse-power, in such a manner that the horse can stand still while the drum rotates and unwinds the rope therefrom; second, to provide mechanism for automatically connecting a horse with the drum in such a manner that the horse will be automatically hitched and unhitched from the drum as required for winding and unwinding a rope therewith.

Our invention consists in the construction, arrangement, and combination of elements and subcombinations, as hereinafter set forth, pointed out in our claims, and illustrated by the accompanying drawings, in which—

Figure 1 is a plan of the machine, parts being broken away, and shows the positions of all the operative parts relative to each other and the frame. Fig. 2 is an elevation, also partly in section, that shows how the drum is detachably connected with the rotatable post.

In the construction of the machine as shown a frame is provided and composed of crossed base-beams 10 11, vertical posts 12, fixed to and rising from the ends of said base-beams, crossed upper bars 13 14, fixed at their ends to the upper ends of said posts, as shown, or in any suitable way. Stay-bars 15 connect and brace the ends of said upper bars. A bed-plate 16, preferably circular in form, is mounted on and fixed to the crossed central portions of the base-beams 10 11, and a rotatable post 17 is stepped in the center of said plate and is extended through a bearing in the crossed centers of the upper bars 13 and 14. A drum 18, having an integral collar $a$, is mounted loosely on the post 17 and is provided with antifriction-rollers 19 on its lower face, which rollers engage the upper face of the bed-plate 16. To fasten the drum to the post, a pin $b$ is placed in coinciding apertures in the post and the collar $a$. Lugs 20—in this instance four in number—are formed on or fixed to the upper face of the drum 18, and said lugs are formed with inclined upper faces and vertical rear ends. A sweep 21 is fixed to and extends laterally from the post 17 immediately above the drum 18 and is further secured to said post by a brace 22. A rock-shaft 23 is journaled for oscillation in bearings on the sweep 21 and is formed with a crank 24 on its inner end, which crank terminates in a hook 25, adapted to engage the vertical rear end portion or face of one or the other of the lugs 20 at times. The rock-shaft 23 also is formed with a crank 26 on its outer end at an angle to the crank 24 and terminating in a hook 27, to which a swingletree or other means of draft may be applied. A leading-pole 28 is bolted to the sweep 21 and extends laterally from the post 17 at an angle to the sweep 21, to which the head of a horse may be connected by means of a strap. A pulley-block 29 is attached to the base-beam 10, and a cable 30 is fixed to the drum to be wound on the drum and extends through the pulley-block and is adapted to be attached at its opposite end to an object to which the horse-power is to be applied by rotating the drum.

Horizontal draft applied to the crank-hook 27 when the horse travels in a circle tends to oscillate the rock-shaft and bring the crank-hook 25 into engagement with one or another of the lugs 20, thus connecting the sweep 21 to the drum and causing the drum to be rotated with the post and wind the cable on the drum. When sufficient cable has been wound on the drum, the horizontal draft is relaxed and the crank 26 and hook 27 descend by gravity and oscillate the rock-shaft 24 in the opposite direction, and thus automatically release the drum-lug from the crank-hook 25. Thereupon the drum may be revolved reversely (by first withdrawing the pin $b$ on the post) to unwind the cable therefrom while the horse stands still, which operation is very advantageous in hoisting hay, pulling stumps, and similar work. During the operation of unwinding the cable from the drum the draft-animal remains stationary and may be started again and repeat the operation of engaging and rotating the drum at the will of the driver.

The machine is portable and may be transported from place to place as desired.

We claim as our invention—

1. A capstan, comprising a post mounted in the center of the top and bottom of the frame, a drum releasably mounted on the lower end of the post and a sweep fixed to and extended laterally from the post above the drum, a rock-shaft for oscillation on the sweep and a crank on the inner end of the rock-shaft to engage said drum at times.

2. In a capstan, a frame, a post mounted loosely in the center of the top and bottom of the frame for rotation, a drum having a collar at its top and center provided with pin-holes coinciding with a pin-hole in the post and a pin for detachably connecting the drum with the post to rotate therewith, a cable fixed to said drum, a pulley-block through which said cable extends, a sweep and detachable connections between said sweep and drum.

3. A capstan and horse-power adjustably combined comprising a frame, a bed-plate fixed to the frame, a post rotatably mounted on the bed-plate and frame, a drum having antifriction-rollers on its bottom and a plurality of lugs on its top loosely mounted on the post and means for fixing it to the post, a sweep fixed to the post to extend horizontally, a rock-shaft having a crank at each end journaled to the sweep, a swingletree pendent from the outer crank of the rock-shaft and a pole for leading a horse fixed to the post, arranged and combined to operate in the manner set forth for the purposes stated.

CHARLES J. LE VALLEY.
WILLIAM T. BIRD.

Witnesses:
C. F. KAYSER,
C. C. STORCK.